July 17, 1951

H. RINIA ET AL 2,560,987

HOT GAS MOTOR WITH CONCENTRICALLY DISPOSED HEAT EXCHANGE COMPONENTS

Filed Aug. 30, 1945

INVENTOR
HERRE RINIA &
FRANCISCUS LAMBERTUS VAN WEENEN

BY *C. F. Wenderoth*

ATTORNEY

July 17, 1951

H. RINIA ET AL 2,560,987

HOT GAS MOTOR WITH CONCENTRICALLY DISPOSED HEAT EXCHANGE COMPONENTS

Filed Aug. 30, 1945

INVENTOR
HERRE RINIA &
FRANCISCUS LAMBERTUS VAN WEENEN
BY
ATTORNEY

Patented July 17, 1951

2,560,987

UNITED STATES PATENT OFFICE 2,560,987

HOT GAS MOTOR WITH CONCENTRICALLY DISPOSED HEAT EXCHANGE COMPONENTS

Herre Rinia and Franciscus Lambertus van Weenen, Eindhoven, Netherlands, assignors to Hartford National Bank & Trust Co., Hartford, Conn., as trustee Application August 30, 1945, Serial No. 613,524
In the Netherlands March 21, 1942

Section 1, Public Law 690, August 8, 1946
Patent expires March 21, 1962

15 Claims. (Cl. 60—24)

This invention relates to improvements in hot gas engines and, more specifically, to means and arrangements thereof for increasing the thermal efficiency and lowering the friction of the thermal path of these engines.

In known hot gas motors, to which also belong the hot air motors, a quantity of gas is heated in a closed space, called "hot chamber," owing to which the gas pressure increases. This gas increased in pressure flows to a second space which is in open communication with the first-mentioned space, this second space being called a "cold chamber." In this chamber the gas sets a piston into motion, expands and meanwhile cools down. A second piston, called "expeller," penetrates into the hot chamber to such an extent that substantially all the gas, with the exception of that portion which is present in the unavoidable clearance, is expelled from the hot chamber. The gas present, after expansion, in the cold chamber may be carried away into the open air. In this case air is utilized as the medium in the motor. Owing to the movement of the expeller out of the hot chamber a fresh quantity of air is sucked into this chamber where it is heated. Motors of this type are referred to as "open cycle motors."

There are also known hot gas motors wherein after expansion the gas is kept enclosed in the cold chamber where it is cooled. In this case the gas pressure decreases and the piston may perform the ingoing stroke, and owing to the displacement of the expeller the same quantity of gas is displaced again to the hot chamber. Motors of this type are referred to as "closed cycle motors." This term has to be understood to include also hot gas motors wherein part of the gas present is transferred from the cylinder to a closed system of tubes or vessels from which it may be admitted again into the cycle.

The invention pertains to hot gas motors of both the above-mentioned types. It has previously been proposed to provide closed cycle hot gas motors with a heater, a regenerator and a cooler, which are traversed by the gas in this order and in the reverse order. It is known to provide open cycle hot gas motors with a heater and a regenerator. In the latter case a cooler may be dispensed with since at the beginning of the cycle each time a fresh quantity of unheated air is sucked in.

By the terms "heater" and "cooler" are meant hereinafter members which serve for the exchange of heat with the gaseous medium whilst along the path of flow the medium is bounded by at least two surfaces which exert a heating and a cooling effect respectively on the medium, the heat being supplied from the outside and carried off to the outside respectively.

By "heater" and "cooler" are also meant members which serve for the exchange of heat with the gaseous medium whilst the stream of gas is subdivided into a large number of separate parts, at least five. This subdivision may be modified in the direction of the gas stream. As the case may be, the heater and the cooler may both previously mentioned properties.

In the known hot gas motors two or more than two of the said elements heater, regenerator and cooler are constructively brought into communication with one another in different ways. It is known, for example, to construct these elements as separate units and to connect them to one another by means of channels. If these connecting channels are narrow the flowing medium encounters a high resistance. If use is made of wide channels the clearance of the motor is increased.

A primary object of the invention is to overcome the above problems.

Another principal object of this invention is to so construct and arrange the various elements of a hot gas engine actively taking part in a thermal exchange process in such a way that resistance to gas flow within the engine is minimized and that maximum thermal efficiency is attained.

Another object of this invention is to provide an arrangement of a heater and a regenerator in a hot gas engine wherein the juncture of the same is made at the largest boundary surfaces of the respective parts.

Figure 1:
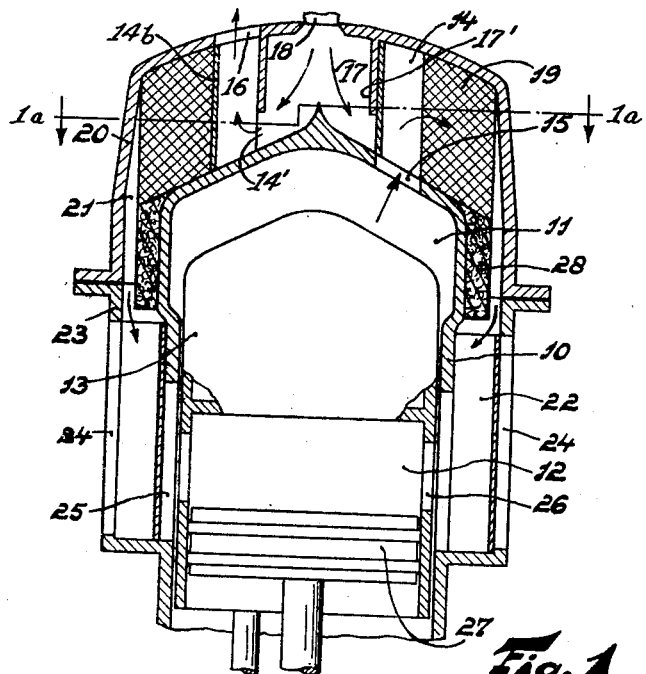
Fig. 1 shows a schematic view in elevation of one embodiment of the present invention.

The invention has for its object to assemble two or more than two of the said elements in such manner that the clearance is reduced as far as possible and that, moreover, the resistance encountered by the gas flowing from one element to another remains as low as possible.

According to the invention, at least two of the said elements are placed in such manner that their largest boundary surfaces are in contact with one another. The gas can thus flow over the whole of the common boundary surface from one element to another whilst the area of the passage for the gas is sufficiently large and substantially no clearance is present between these elements.

According to one particular embodiment of the invention the heater and the regenerator are arranged in such manner that the latter acts as a thermal insulator for the former, owing to which the outer wall of the motor is not unnecessarily exposed to the radiation of heat. Loss of heat due to radiation is thus reduced since the heat radiated towards the regenerator is caught in the latter and is delivered again to the stream of gas as useful heat.

According to a further embodiment of the invention, at least two of said elements are arranged concentrically, in which event either the regenerator may surround the heater, which reduces the loss of heat to the exterior or the heater may be located on the outside. The last-mentioned form of construction is utilized more particularly if the source of heat is arranged around the heater, for example in the form of a plurality of gas flames arranged in a ring and directed to the inside.

According to a further embodiment of the invention at least two of the said elements concentrically surround the cylinder, the most advantageous form of construction being that in which the heater surrounds the hot chamber and the regenerator surrounds the heater. In this case both the hot chamber and the heater are insulated by the regenerator from the outer wall of the engine. Moreover, according to the invention, the heater may protrude in the longitudinal direction from the cylinder and in the space thus formed in the heater may be provided the combustion chamber for the flue gases of the motor. In this case the regenerator should preferably be divided into two portions of which the one surrounds the heater and the other surrounds the cooler. The heater and the cooler may be placed in this case side by side in the direction of the axis of the cylinder. At the place of the hot and of the cold chamber the external diameter of the cylinder may be equal and as small as possible.

According to a further embodiment of the invention, all three elements concentrically surround each other and the cylinder, the cooler being arranged on the outside. On the outer wall there are consequently always cooled gases so that the outer casing of the motor is strained only mechanically but is substantially not thermally strained. According to one particular form of construction of the motor according to the invention, it is advantageous to effectuate the supply of heat to the heater through the intermediary of a liquid metal or metal alloy, in which event the heater and also the motor may be given very small dimensions.

The invention will be explained more fully with reference to the accompanying drawing which represents, by way of example, a few embodiments thereof.

Figure 2:
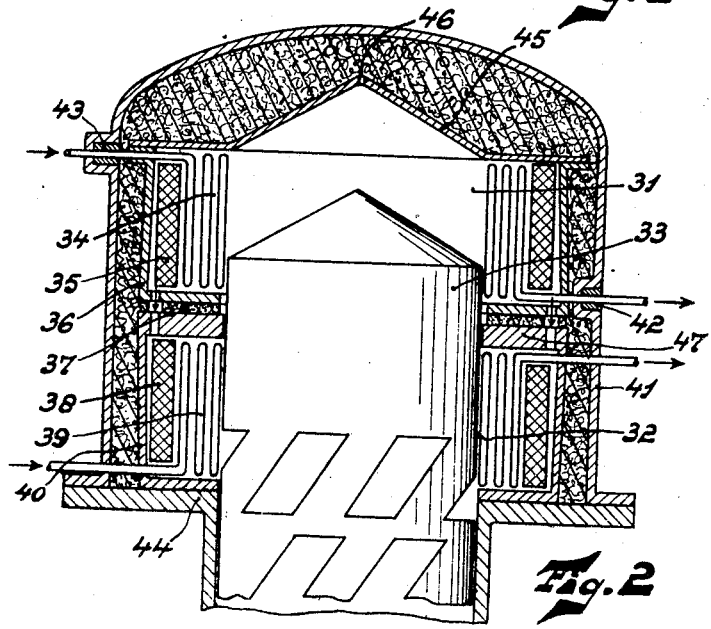
Fig. 2 shows a view similar to Fig. 1 of another embodiment of this invention.
Figure 3:
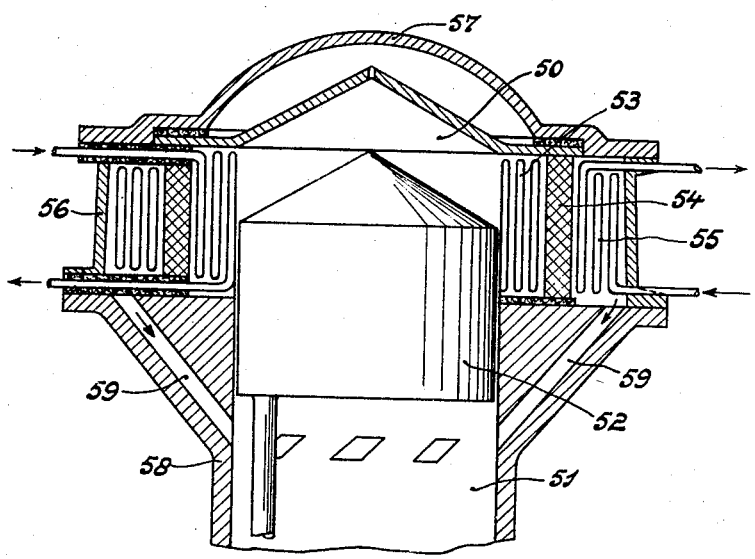
Fig. 3 shows still another similar view of another embodiment of this invention.

Figs. 1, 2 and 3 represent a few forms of construction of hot gas motors wherein at least the heater and the regenerator are concentrically arranged in such manner that their largest boundary surfaces are in contact with one another.

Figure 1A:
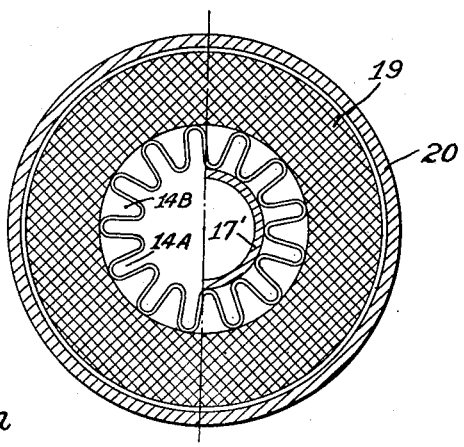
Fig. 1A shows a transverse cross sectional view of the heater construction shown in Fig. 1, the direction lines 1A—1A showing the direction from which the vertical view of the heater is taken on the Fig. 1A drawing.

In Fig. 1, 10 denotes the cylinder of a hot-gas motor. This cylinder is divided into a hot chamber 11 and a cold chamber 12, these chambers being separated from one another by an expeller 13 which is guided in the cold portion of the cylinder 10. The hot chamber 11 communicates with a heater 14 arranged above the cylinder. This heater is constituted by a generally cylindrically curved plate of heat proof and yet conducting material, for example aluminium bronze, which plate is undulated like an accordion as shown in Fig. 1A. The bottom part of heater 14 contains a number of openings 14' on a side thereof. Inside the heater is a combustion chamber 17 in which a gas mixture is combusted by means of a burner 18. Chamber 17 has downwardly depending curved walls 17' contiguous to the inner convolutions 14a of the heater 14. The hot flue gases pass between the two walls of the heater in the direction of the arrows shown and leave the motor through apertures 16 provided in an outer envelope 20. These apertures 16 only correspond with slits formed between successive inner convolutions 14a of the heater 14 which are open in the direction of the combustion chamber 17.

The working gas medium in the hot chamber 11 is admitted through a set of apertures 15 in the cylinder head exactly into intermediate slits formed between successive outer convolutions 14b and consequently takes up the heat from the flue gases through the walls of the heater 14. In the direction of the arrows shown the heated gas flows from the outwardly directed or intermediate slits in the heater 14 to a directly contiguous regenerator 19. This regenerator is constituted by a cylindrical coil of thin wire with many intervening spaces. This wound regenerator coil directly surrounds the heater 14. The outlet apertures or openings 14' of the heater are consequently directly contiguous to the regenerator mass so that the area of the passage for the gas flowing from the heater 14 to the regenerator 19 is a maximum and consequently the resistance encountered by the flowing gas is a minimum. Moreover, the regenerator 19 acts as a thermal insulator of the heater 14 since the heat radiated from this heater is intercepted by the regenerator and is consequently supplied again to the process of operation.

The gases which come from the regenerator and which consequently have cooled down already flow through a cylindrical channel 21 between the cylinder 10 and the outer envelope 20 to a cooler 22. At the place of the channel 21 the hot chamber 11 of the cylinder 10 is surrounded by a layer of insulating material 28 which prevents cooling down of the hot chamber. The cooler 22 is of the same type as the above-described heater 14. The portions between the outer convolutions called slits open to the outside communicate with the open air through apertures 24 in the outer casing 23 to create a cooling surface. The gas flows through the slits open to the inside or around the inner convolutions and through apertures 25 in the cylinder casing 10 and through corresponding ports 26 in the expeller 13 to reach the cold chamber 12 present above a piston 27. The elimination of heat in the cooler 22 is effected here either by direct delivery of heat to the open air or, if the natural draught is insufficient for this purpose, by means of an air current which is blown into the outermost slits of the cooler.

Fig. 2 represents a hot-gas motor wherein both the heater and the cooler concentrically surround the cylinder and are both surrounded by part of the regenerator. A heater 34 and a cooler 39 consist here of a system of tubes through which passes a liquid metal or metal compound and a cooling liquid respectively.

The heater 34 concentrically surrounds a hot chamber 31 so that the radiation of heat from this chamber in the radial direction is prevented. The heat radiated in the axial direction is intercepted by a cylinder head 45 which is surrounded by a layer of insulating material and by an envelope 41 which takes up the forces exerted on the cylinder head. Between this envelope and the wall of the cylinder prevails the average pressure of the cyclic process so that the forces exerted on the cylinder itself are only produced by the pressure variations during the cyclic process. The average pressure between the cylinder and the envelope is maintained at the correct value owing to the passage of gas through a capillary aperture 46 in the cylinder head.

The heat radiated by the heater 34 is intercepted by a regenerator 35 which directly adjoins the heater and which surrounds the latter concentrically. The wall 36 of the cylinder is consequently not exposed to the high temperature prevailing in the hot chamber 31. When being displaced from the hot chamber 31 the gas flows at first through the heater 34 and then through the regenerator 35. The largest boundary surface of the heater 34 is in direct contact both with the hot chamber 31 and with the regenerator 35, the area of the passage for the gases being consequently a maximum. The regenerator consists of two portions, viz. cylindrical coils 35 and 38, the former surrounding the heater and the latter surrounding a cooler 39. Since the heater and the cooler have to change the heat content of the same quantity by weight of gas, the cooling and the heating surfaces are in general equal, the dimensions of the cooler and those of the heater being therefore equal. If also the regenerator is divided into two equal portions, the cylinder diameters of the hot and cold chambers are equal, which contributes to the simplicity of construction of the motor.

The gas coming from the regenerator 35 flows between the regenerator and the cylinder walls 36 and 40 to the regenerator 38 and hence through the cooler 39 to the cold chamber 32. The regenerator 38 and the cooler 39 are constructively arranged in the same manner as the regenerator 35 and the heater 34 so that here the same advantages are obtained as regards the area of passage for the gases. The cylinder wall 36 is in contact with the hot portion of the motor, the cylinder wall 40 on the contrary with the cold portion. In order to avoid loss of heat due to conduction in the wall, these portions are separated by a layer of insulating material 37.

The expeller 33 is guided not only in the cold portion 44 of the cylinder but also in an annular portion 47 of the cylinder wall 40. This annular guide 47 acts at the same time as a seal between the hot and cold portions of the cylinder.

Fig. 3 represents a form of construction which substantially corresponds to that according to Fig. 2. In this form of construction a heater 53, a regenerator 54 and a cooler 55 are concentrically arranged around each other and around a cylinder 50. The heater 53 directly adjoins the hot chamber. The gas flows from the hot chamber over the whole of the circumference of the cylinder into the heater 53. From this heater the gas flows over the whole of the common boundary surface between the heater and the regenerator to the latter and then in an analogous manner to the cooler. The outer wall 56 of the cylinder consequently comes exclusively into contact with cooled gases so that separate thermal insulation is useless. Heat radiated by the heater and the hot chamber is intercepted by the regenerator which acts here at the same time as an insulator. The cylinder head is provided with a cap 57 which takes up the force whilst the thermal insulation is effected between the cylinder head and this cap.

From the cooler 55 the gas passes through channels 59 in the cylinder 58 to the cold chamber 51. The hot and the cold chambers are separated from one another by an expeller 52 whose guiding and sealing take place in the cylinder 58.

What we claim is:

1. A hot gas engine comprising a cylinder, a hot chamber, a cold chamber, a heater having heat exchange surfaces, and a regenerator, said heater and regenerator being arranged concentrically, said regenerator surrounding substantially all of said heat exchange surfaces of said heater whereby said regenerator functions as thermal insulation in the radial direction for said heat exchange surfaces.

2. In a hot gas engine a cylinder, a hot chamber, a cold chamber, a heater having heat exchange surfaces, a regenerator, and a cooler having heat exchange surfaces, at least two of the last three parts being arranged concentrically said two parts lying one substantially completely within the other whereby said one is thermally insulated in the radial direction by said other.

3. In a hot gas engine, a cylinder, a hot chamber, a cold chamber, a heater, a cooler, and a two part regenerator, one part concentrically surrounding said heater, the other part concentrically surrounding said cooler.

4. In a hot gas engine, a cylinder, a hot chamber, a cold chamber, a heater, a regenerator and a cooler, the last three parts concentrically surrounding said cylinder, said cooler being on the outside.

5. In a hot gas engine as claimed in claim 1, wherein said heater comprises conduits connected to a source of a heated fluid medium.

6. In a hot gas engine, an outer elongated envelope with interior downwardly depending walls, an interior cylinder spaced therefrom, a convoluted hollow body abutting an end part of said cylinder, said body having part of its inner convolutions in contact with said depending walls, fuel inlet means to a combustion chamber formed from said walls and inner convolutions, an exhaust aperture in said envelope at an end opposite each of the spaces defined within said outer convolutions of said convoluted body whereby an efficient combustion chamber and heater are formed.

7. In a hot gas engine, an outer elongated envelope with interior downwardly depending walls, a spaced interior cylinder enclosing a hot chamber, a hollow body having inner and outer convolutions abutting an end portion of said cylinder, said inner convolutions having a portion thereof contiguous to said walls, fuel inlet means to a combustion chamber formed from said walls and inner convolutions, exhaust means including the outer surfaces of said convolutions, a regenerator exteriorly concentric with said hollow body whereby a low loss heat path is formed.

8. In a hot gas engine as claimed in claim 7 wherein said cylinder is provided with apertures which open into some of the spaces formed between some of said outer convolutions to form a direct heat path between said regenerator and said hot chamber.

9. In a hot gas engine as claimed in claim 7 wherein a quantity of insulation material is placed about a portion of said hot chamber.

10. In a hot gas engine, an elongated exterior shell of predetermined diameter having a number of spaced holes in an end portion thereof, a smaller diameter interior cylinder within said shell and spaced therefrom, said cylinder having a corresponding end portion thereof with spaced holes therein in spaced relationship with said shell end portion, a hollow body having inner and outer convolutions transversely disposed thereof forming inner and outer spaces therebetween, said body being interposed between said shell end portion and said cylinder end portion and in end abutment with both said portions, said body being positioned so that said inner spaces each align with one of said holes in said shell end portion and said outer spaces each align with one of said holes in said cylinder end portion, and a regenerator surrounding said hollow body and having the inner periphery thereof in gas passage communication with said outer spaces of said hollow body and the outer periphery thereof in gas passage communication with the space formed between said shell and said cylinder.

11. A hot-gas engine comprising a hot chamber, a heater, a substantially annular regenerator and a cold chamber, said heater and said substantially annular regenerator being arranged coaxially, said heater being surrounded by said substantially annular regenerator, with the periphery of said heater being defined at least in part by the interior surface of said annular regenerator whereby fluid may pass therebetween in a radial direction.

12. A hot-gas engine comprising a hot chamber, a heater, a regenerator, a cold chamber, and a cooler, said cooler and regenerator being arranged coaxially, said cooler being surrounded by said regenerator, and communicating means between said cooler and said regenerator for permitting fluid to pass therebetween in a radial direction.

13. A hot-gas engine comprising a hot chamber, a heater, a regenerator and a cold chamber, said heater, regenerator and hot chamber all arranged coaxially, said heater being surrounded by said regenerator, communicating means between said heater and said regenerator for permitting fluid to pass therebetween in a radial direction, said heater surrounding said hot chamber, and communicating means between said heater and said hot chamber for permitting fluid to pass therebetween in a radial direction.

14. A hot-gas engine comprising a hot chamber, a heater, a regenerator, a cold chamber and a cooler, said cooler, regenerator and cold chamber being arranged coaxially, said cooler being surrounded by said regenerator, communicating means between said cooler and said regenerator for permitting fluid to pass therebetween in a radial direction, said cooler surrounding said cold chamber, and communicating means between said cooler and said cold chamber for permitting fluid to pass therebetween in a radial direction.

15. A hot-gas engine comprising a hot chamber, a heater, a two part regenerator, a cold chamber and a cooler all in coaxial relationship, said heater being surrounded by one part of said regenerator, said hot chamber being surrounded in turn by said heater, communicating means between said heater and said one part of said regenerator for permitting fluid to pass therebetween in a radial direction, communicating means between said heater and said hot chamber for permitting fluid to pass therebetween in a radial direction, said cooler being surrounded by the other part of said regenerator, said cold chamber being surrounded in turn by said cooler, communicating means between said cooler and said other part of said regenerator for permitting fluid to pass therebetween in a radial direction, communicating means between said cold chamber and said cooler for permitting fluid to pass therebetween in a radial direction, and communicating means between said two parts of said regenerator for permitting fluid to pass therebetween in an axial direction.

HERRE RINIA.
FRANCISCUS LAMBERTUS van WEENEN.

REFERENCES CITED

The following references are of record in the file of this patent:

UNITED STATES PATENTS

| Number | Name | Date |
| --- | --- | --- |
| 206,597 | McKinley | July 30, 1878 |
| 356,147 | McKinley | Jan. 18, 1887 |
| 389,045 | Bair | Sept. 4, 1888 |
| 1,231,376 | Kasley | June 26, 1917 |

FOREIGN PATENTS

| Number | Country | Date |
| --- | --- | --- |
| 819 | Great Britain | Mar. 25, 1862 |
| 196,620 | Great Britain | Oct. 20, 1924 |